Figure 3:
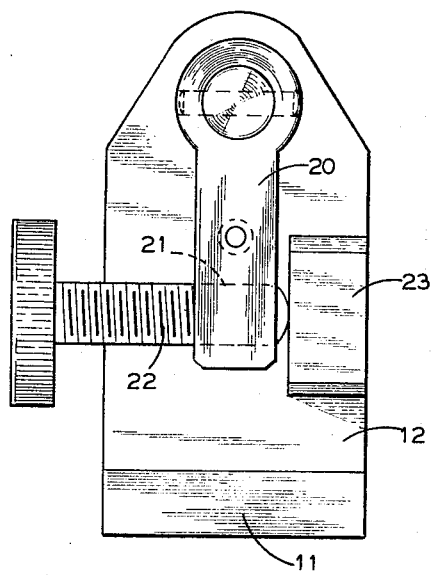

Oct. 25, 1966 G. LEHNERT 3,280,609
METHOD AND MEANS FOR FORMING THIN METAL TUBING
Filed June 18, 1962 2 Sheets-Sheet 1
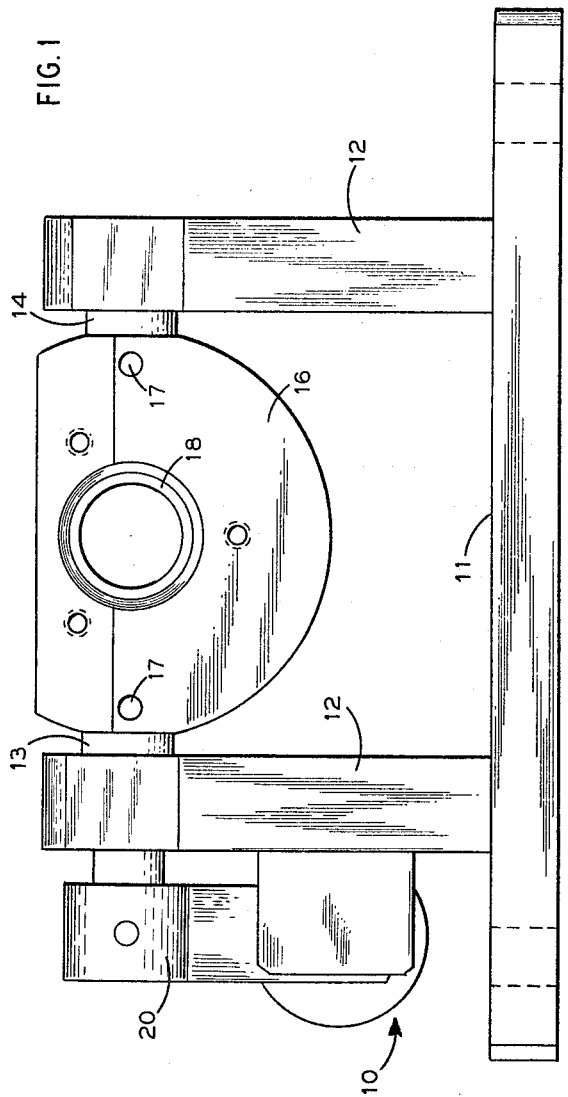
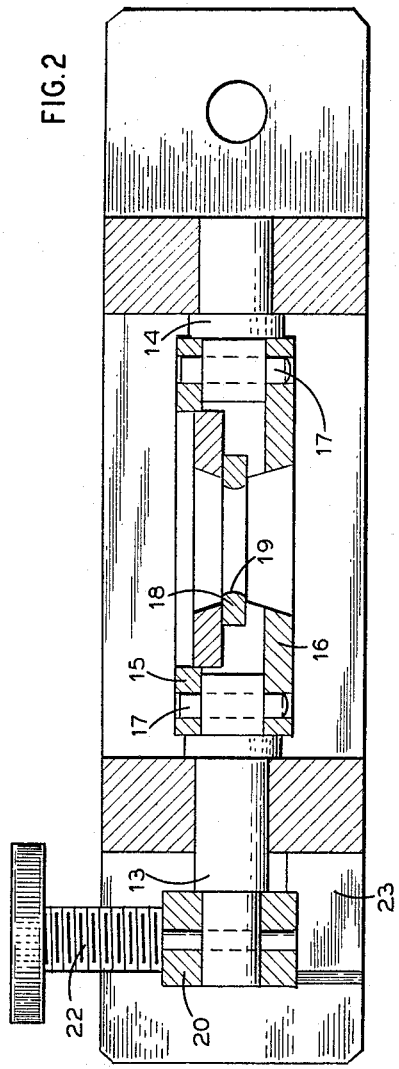
INVENTOR.
Gunther Lehnert
BY
ATTORNEY Oct. 25, 1966    G. LEHNERT    3,280,609
METHOD AND MEANS FOR FORMING THIN METAL TUBING
Filed June 18, 1962    2 Sheets-Sheet 2

INVENTOR.
Gunther Lehnert
BY
*Philip S. Hilbert*
ATTORNEY

United States Patent Office 3,280,609
Patented Oct. 25, 1966

3,280,609
METHOD AND MEANS FOR FORMING THIN
METAL TUBING
Gunther Lehnert, Hannover-Bothfeld, Germany, assignor to Hackethal-Draht- und Kabel-Werke A.G., Hannover, Germany
Filed June 18, 1962, Ser. No. 203,397
4 Claims. (Cl. 72—176)

This invention relates to a method and means for forming thin metal tubing, and more particularly concerns the formation of such tubing by continuously converting a thin metal strip into tubular form and continuously butt seaming the longitudinal joint formed by adjacent edges of said strip by a welding operation or the like.

In converting a thin metal strip into tubular form, conventional forming devices located at successive intervals are used to progressively shape the flat strip into tubular form and to bring the original side edges of the strip into opposed relation for welding the seam therebetween. The movement of such strip and the action of the forming devices must be such as to uniformly locate the opposed strip edges, particularly at the welding station, in order to provide a uniform, strongly welded joint.

The known forming devices usually comprise forming rollers or sleeves and guides which progressively manipulate the original flat strip into desired shape. Furthermore, guide rollers and sleeves are provided immediately adjacent the welding station and on either side thereof.

However, with such known supports and guides, the metal of the formed strip tends to be abraded or chamfered through contact with said supports and guides and metal tends to flake on circumferential portions of the tubing. This in turn affects the action of subsequent guides and may even result in a jamming action which halts the movement of the tubing.

Furthermore, with known guiding rollers there may be a tendency to deform the thin walled metal tubing, and in many cases, the guide rollers do not engage the entire circumference of the moving tubing. Accordingly, edge portions of the guide means may chamfer the metal surface of the tubing.

In the known procedures for forming longitudinally seamed metal tubing, the successive sets of forming rollers which progressively convert the flat strip to tubular form, such rollers inherently set up transversal stresses in the moving strip. Accordingly, an object of this invention is to provide a procedure and means which utilizes such transversal stresses to bring the opposed edges of the metal strip into desired juxtaposition for welding into a butt seam, in the absence of the usual supporting or guiding rollers or sleeves.

Another object of this invention is to provide an improved procedure and apparatus for precisely locating the opposed edges of a metal strip which has been progressively converted into tubular form, by the use of a single ring member located adjacent the welding station and operative to dispose the opposed edges of the moving strip in gradually converging relation as the same approach said ring, with the converging edges meeting and forming an apex at a point beyond the ring and at adjusted distances therefrom, the point at which said edges meet coinciding with the welding point.

A further object of this invention is to provide a forming ring of hard metal alloy for drawing the formed tubing to its final shape, the inner diameter of said ring snugly fitting the outer circumference of the finished tubing, the area of actual contact of the ring and the tubing wall being minimized.

Still another object of this invention is to provide a forming device of the character described, which includes means for mounting the forming ring, together with means for adjusting the angular disposition of said ring in use.

Other objects of this invention will in part be obvious and in part hereinafter pointed out.

Figure 4:
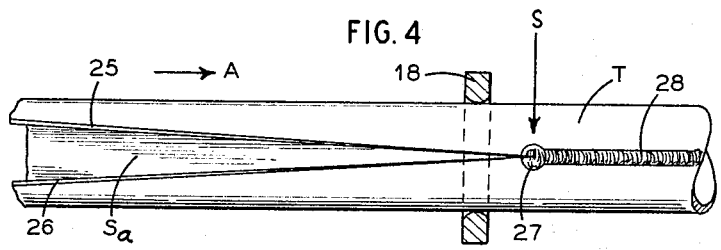
Figure 5:
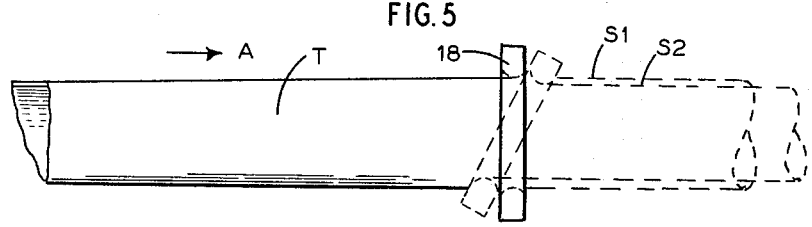

In the drawing,
FIG. 1 is a side elevational view of a device embodying the invention;
FIG. 2 is a top plan view thereof, with parts in section;
FIG. 3 is an end view thereof;
FIG. 4 is a top plan view showing diagrammatically the use of said device; and
FIG. 5 is a side elevational view thereof.

As indicated in the drawings, 10 designates a device embodying the invention. The same comprises a base member 11 adapted to be secured in place in alignment with forming rollers located at spaced longitudinal intervals, not shown, which progressively convert a thin flat metal strip into approximate tubular shape.

A pair of vertically disposed, spaced standards 12 upstanding from base 11, support at their upper ends a pair of horizontally disposed, aligned pivot members 13, 14. Members 13, 14 are secured at their inner, opposed ends to a pair of opposed clamping rings 15, 16, by suitable cross bolts 17. A ring 18 of hard metal alloy is suitably held between clamping rings 15, 16. Ring 18 is formed with an inner arcuate edge 19. Ring 18 is adapted to receive the moving tubing T and to finally form the same as hereinafter described.

The outer end of pivot member 13 has affixed thereto a lever member 20, which is formed at its lower end with a threaded through opening 21. An adjusting screw 22 is threaded into opening 21 of lever member 20, and its inner end bears on an abutment member 23 projecting laterally from standard 12. Thus, the position of forming ring 18 may be adjusted by turning screw 22 to thereby swing clamping rings 15, 16 to a desired angular position with pivot members 13, 14 as an axis.

Ring 18 has its inner diameter snugly fitted to the outer diameter of the tubing T to be formed and the convex edge 19 thereof reduces the actual contact thereof with the metal of said tubing, to a minimum.

As indicated in FIG. 4, with tubing T moving in the direction indicated by the arrow A, the same is passed through forming ring 18, with the lateral edges of the metal strip S as at 25, 26 disposed in progressively converging relation. Said edges 25, 26 form an apex as at 27, which represents the final abutment of said edges and also corresponds to the welding point S. It will be apparent that such S is slightly beyond the forming ring 18.

With the passage of tubing T through ring 18, the inner transverse stresses originating in the metal strip S tend to bring the longitudinal opposed edges 25, 26 thereof into a butt joint beyond said ring and thereby insure a precise relationship of said edges which allows for a uniform welded joint as at 28.

The apex point 27 at which strip edges 25, 26 meet to coincide with the welding point S, may be shifted as desired, by tilting forming ring 18 through adjustment of screw 22. Thus, as shown in FIG. 5, when ring 18 is shifted from its position shown in full lines, to the angular position indicated in dotted lines, the welding point originally at $S_1$ is displaced to the position $S_2$.

As the forming ring 18 is concentric with tubing T, in its original position, the angular tilt of said ring will cause an elliptical deformation of the cross section of tubing T, thereby the stresses tending to bring the opposed converging edges 25, 26 together, are increased and thus press said edges firmly against each other.

As various changes might be made in the embodiment of the invention herein disclosed without departing from the spirit thereof, it is understood that all matter herein shown or described shall be deemed illustrative and not limiting except as set forth in the appended claims.

What is claimed is:

1. In the method of converting a longitudinally moving thin metal strip into tubular form by progressively curving the lateral portions of said moving strip to bring the opposed longitudinal edges of said strip progressively toward each other in convergent relation to each other whereby said moving strip approaches tubular form, the step of passing the moving curved strip through a ring shaped forming member disposed transversely of and substantially vertical with respect to the path of movement of the strip to bring the peripheral outer surface portions of the curved strip into continuous contact with the inner peripheral surface of said forming member, the inner diameter of said forming member being related to the outer diameter of the finished tubing so as to be effective to bring the converging edges of said moving curved strip into abutting relation at a point in the travel of said moving curved strip spaced beyond the exit side of said forming member, and welding the converging edges of said moving curved strip at said point of abutment.

2. In the method as in claim 1 wherein said forming member is mounted for tilted movement about a horizontal diametral axis thereof, and adjusting the angular tilt of said forming member relative to the vertical to regulate the longitudinal spacing of the point of abutment of the converging longitudinal edges of said moving strip with respect to said horizontal diametral axis of the forming member.

3. In means for forming a longitudinally moving thin metal strip into tubular form by progressively curving the lateral portions of said strip toward each other to bring the opposed longitudinal edges of said moving strip into progressively converging relation, forming means comprising a ring shaped member arranged to allow the moving curved metal strip to pass therethrough, said ring shaped member having inner peripheral surface portions in contact with the outer circumferential surface portions of said curved metal strip, the diameter of the inner peripheral portion of said ring shaped member being related to the outer diameter of the finished tubing as to bring the converging longitudinal edges of the moving curved strip into abutment at a point beyond the exit side of said ring shaped member.

4. In means as in claim 3 and further including means for mounting said ring shaped forming member for tilted angular movement about a horizontal diametral axis thereof, and means for adjusting the angular position of said forming member with respect to the vertical whereby to adjust the spacing of the point of abutment of the converging longitudinal edges of said curved strip with respect to said horizontal axis of the forming member.

References Cited by the Examiner

UNITED STATES PATENTS

| 360,936 | 4/1887 | Warwick | 153—32 |
|---|---|---|---|
| 611,222 | 9/1898 | Ries | 113—33 |
| 2,245,320 | 6/1941 | Bletso | 72—463 |
| 2,526,237 | 10/1950 | Johnson | 72—381 |
| 2,700,408 | 1/1955 | Babbitt | 113—33 X |
| 3,001,569 | 9/1961 | Gradt | 153—54 |

FOREIGN PATENTS 427,068   5/1911   France.

CHARLES W. LANHAM, *Primary Examiner.*

NEDWIN BERGER, *Examiner.*

L. OTTO, R. D. GREFE, *Assistant Examiners.*